Nov. 18, 1969    TOMIO TSURUOKA ET AL    3,478,663
EXPOSURE METER FOR SINGLE LENS REFLEX CAMERA
Filed Dec. 21, 1964

INVENTORS
TOMIO TSURUOKA and JUN SHIMOMURA
BY
ATTORNEY 3,478,663
EXPOSURE METER FOR SINGLE LENS
REFLEX CAMERA
Tomio Tsuruoka and Jun Shimomura, Tokyo, Japan, assignors to Nippon Kogaku K.K., Tokyo, Japan, a corporation of Japan
Filed Dec. 21, 1964, Ser. No. 419,690
Claims priority, application Japan, Apr. 16, 1964, 39/21,269
Int. Cl. G03b 19/12; G01j 1/40, 1/42
U.S. Cl. 95—42                                                    1 Claim

ABSTRACT OF THE DISCLOSURE

In single lens reflex cameras having the light sensitive area of an exposure meter in the light path of the view finder system, erroneous measurements of the light intensity resulting from light coming through the eye-piece of the view finder become a problem due to the increased sensitivity of the present day improved materials. Efforts have been made to prevent or reduce the errors caused by this extraneous light and a number of devices have been introduced for this purpose.

---

Among prior art devices, for example, the eye-piece is covered when a photometric measurement is made to bar the light rays coming from the opposite direction. A polarizing plate has also been proposed for reducing such extraneous light rays. In the former example although all light entering the eyepiece is cut off, the view finder itself is not utilized at the moment of photometry. In the second example, the brightness of the view finder is diminished.

The object of the present invention is to provide an exposure meter free from any such difficulties which should prevent free observation through the view-finder means, by turning to account the fact that the majority of disadvantageous opposite or inverse incident light rays consists of those obliquely incident light rays with which those from the observer's head do not interfere.

Other objects and advantages of the invention will be best understood from the following description of illustrative embodiments thereof when read in conjunction with the accompanying drawing in which.

Figure 1:
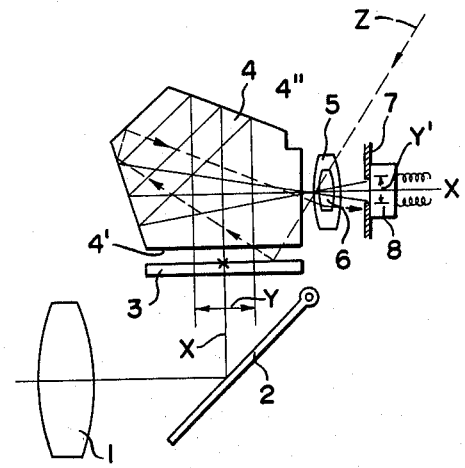
FIG. 1 is a side view of an illustrative embodiment of the invention.
Figure 2:
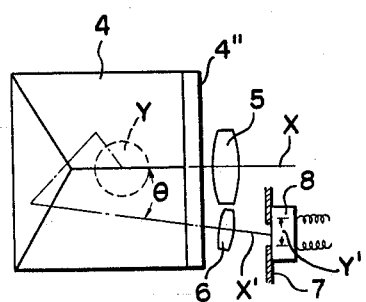
FIG. 2 is a plan view of the illustrative embodiment of FIG. 1.

The objective 1, the mirror 2, the focussing glass 3, the pentagonal roof prism 4 and the eye-piece 5 constitute a known view-finder optical system for single lens reflex cameras. The optical axis for this view-finder system is designated X. The axis X', or photometric axis, of the exposure meter inclines by an angle $\theta$ with respect to the optical axis X in the vicinity of the eyepiece 5 facing the exit surface 4" of the penta prism 4. A lens 6 is arranged on the photometric axis X', and a field stop 7 is arranged at a position conjugate with the focusing glass 3 to project a portion of the screen formed on the glass 3 of the field stop 7 through the lens 6.

An aperture Y' provided in the stop 7 is exactly positioned to correspond to a specified area Y on the focussing glass 3 to be measured for light intensity. A light sensitive body 8 placed behind the stop 7 is connected to a known exposure meter circuit comprising a galvanometer 9, a variable resistor 10 and a battery 11 for indicating the proper exposure time in accordance with the luminance measured of the area Y on the focussing glass 3.

With the above explanation of the structure, the light rays from the screen focussed on the focussing glass 3 by the objective 1 is diffused by the focussing glass 3 and a portion of the diffused light rays is introduced into the penta prism along the view finder axis X and reaches the eye of an observer. Another portion of the diffused light rays is introduced into the penta prism along the photometric axis X' and reaches the stop 7 through the collecting lens 6. If there are no stray light rays within the penta prism or the collecting lens 6 has no aberration, the light rays within the specific area Y on the focussing glass 3 reach the light receiving body 8 through the aperture Y'. However, the diffusion light rays from a point P outside of the specific area Y reaches the point P' outside of the aperture Y' and blocked by the stop 7. Consequently, the specific area Y is photometered and the light rays outside of the area Y have very little effect on the photometering.

Now, the greater part of the light rays incident to the penta prism 4 through the eyepiece 5 is blocked by the head of the observer before it enters into the prism 4, and the remaining part Z which is not blocked is, as shown by the dotted line, totally reflected by the light incident surface 4' adjacent to the focussing glass 3, and then reflected by the other surface of the prism 4 back to the exit surface 4" at the eyepiece side. This counter light ray is of relatively strong intensity but it has a sufficiently large inclination to the photometric axis X' as though it entered from outside the specified area so that it is blocked by the step 7 and not received by the body 8.

Figure 3:
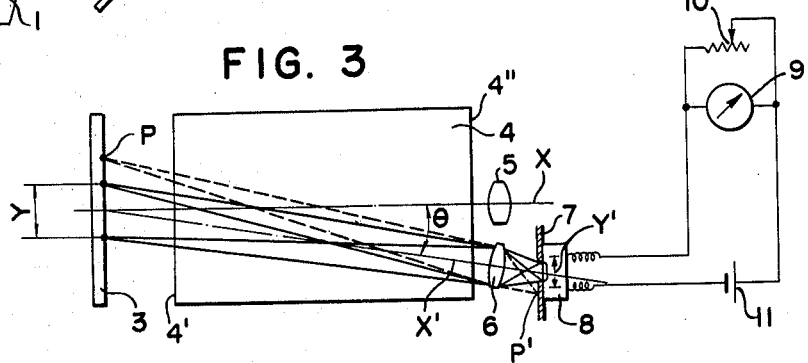
FIG. 3 is a diagram illustrative of the principles according to the invention.

As seen, since the oppositely incident, oblique light rays, representing the majority of the inversely incident rays which invite errors in measurement, are safe from interference by the shadow of observer's head because of their obliquity, traveling through areas other than specified area Y to arrive at objective 1 and be reflected from its surfaces back to focal plane glass 3 and diffused, the diffusion taking place onto areas other than specified area Y. Consequently, the diffused light rays are, as illustrated in FIGURE 3, prevented by field stop 7 and do not directly impinge upon sensitive body 8.

Hence those light rays incident otherwise on this body, and producing errors in measurement, are reduced to a minimum, enabling accurate measurement of light intensity.

As described herein, the present invention provides an exposure meter arrangement in a single lens reflex camera which will permit observation through the view finder at all times and whereby the least degree of error is introduced in the measurement of light intensities.

What is claimed is:

1. A single lens reflex camera having a viewfinder and an eyepiece having an axis, the combination comprising
    an objective lens,
    a reflecting mirror,
    a focusing glass on the viewfinder axis for determining the photographic and photometric fields,
    a collecting lens having an axis at a slight angle to the eyepiece axis,
    a penta roof-edge prism for directing a portion of the diffused light rays of the focusing glass along the eyepiece axis to the eyepiece and a portion of the diffused light rays of the focusing glass along the collecting lens axis to the collecting lens, the eyepiece and collecting lens axis intersecting at the center of the focusing glass,
    a stop positioned behind the collecting lens and conjugate with the focusing glass, said stop having an aperture corresponding to a relatively central portion of the focusing glass to be photometered, and a photosensitive element forming a part of an exposure meter circuit positioned behind the stop; whereby the extraneous light rays not blocked by the head of an observer and entering the eyepiece and the prism through the exit surface are reflected by the internal surfaces of the prism back through the exit surface at an angle to the collecting lens axis and are thereby blocked by the stop.

References Cited

UNITED STATES PATENTS

| | | |
|---|---|---|
| 1,895,853 | 1/1933 | Kennedy. |
| 3,134,021 | 5/1964 | Ploke. |
| 3,194,136 | 7/1965 | Ort. |
| 3,264,964 | 8/1966 | Ebertz. |
| 3,282,178 | 11/1966 | Nelson. |
| 3,315,581 | 4/1967 | Rühle et al. |
| 3,324,776 | 6/1967 | Matsumoto. |
| 3,272,105 | 9/1966 | Manderfeld _____ 95—42 |
| 3,363,505 | 1/1968 | Stone _____ 88—23 |

FOREIGN PATENTS 938,764   1/1956   Germany.

JEWELL H. PEDERSEN, Primary Examiner

WARREN A. SKLAR, Assistant Examiner

U.S. Cl. X.R.

356—225, 233